(No Model.)
E. S. PEROT.
DISTRIBUTING BOX FOR ELECTRICAL CONDUITS.
No. 416,235. Patented Dec. 3, 1889.
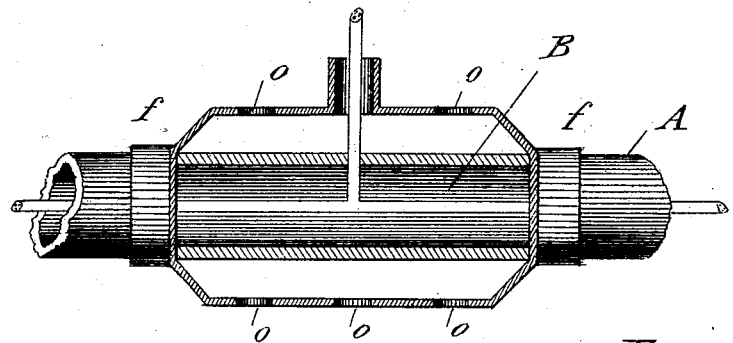
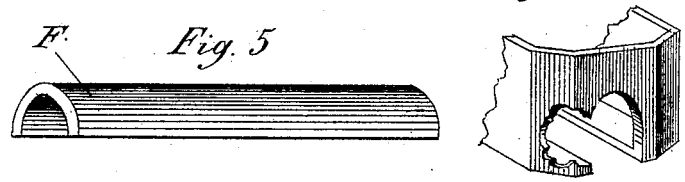
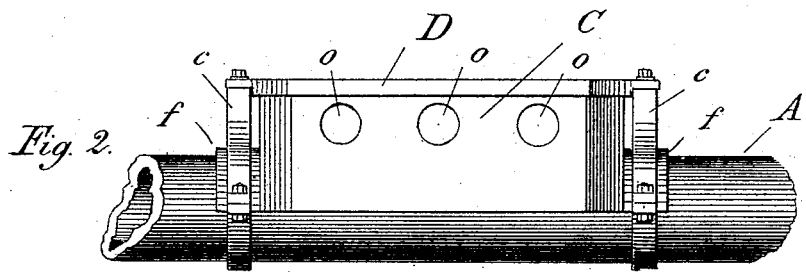
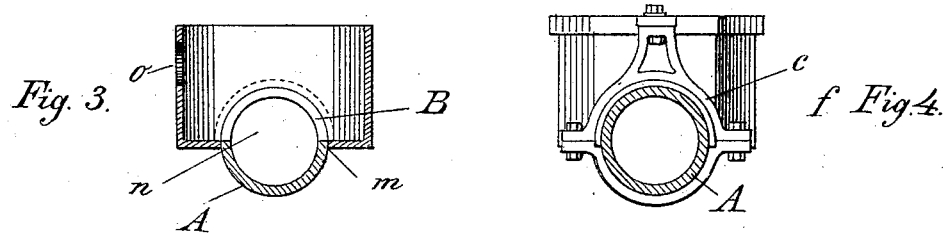
WITNESSES:
Gertrude Ward
Amelia L. Ware
INVENTOR
Edward S. Perot
BY
Frank MacArthur
ATTORNEY

UNITED STATES PATENT OFFICE.

EDWARD S. PEROT, OF NEW YORK, N. Y.

DISTRIBUTING-BOX FOR ELECTRICAL CONDUITS.

SPECIFICATION forming part of Letters Patent No. 416,235, dated December 3, 1889.

Application filed June 29, 1889. Serial No. 316,111. (No model.)

*To all whom it may concern:*

Be it known that I, EDWARD S. PEROT, a citizen of the United States, residing at New York, in the county of New York and State of New York, have invented certain new and useful Improvements in Distributing-Boxes for Electrical Conduits, of which the following is a full description.

My invention relates to underground conduits for electric wires or cables, and more particularly to certain novel devices for distributing branch wires from the main line at any desired point. These devices constitute what may be termed a "distributing-box," although, as will be seen hereinafter, the pipe or conduit itself forms a constituent part of the structure. In the case of distributing-boxes and man-holes as ordinarily employed, the pipe or conduit containing the wires is intercepted at the point where the wires or cables pass through the box, terminating at one side of the same and beginning again on the opposite side. This arrangement effectually exposes the wires and cables for the purpose of making branch connections, but considerable difficulty is experienced in passing the wires and cables into such a conduit system, due to the fact that the rod or "pilot" in passing through the box tends to diverge from its proper course particularly in a downward direction, and for that reason fails to enter the continuation of the pipe or conduit on the other side of the box. This is particularly a source of annoyance in a multiple system where the rod diverging sidewise or downward often enters the wrong tube, creating confusion and delay.

My present invention is designed to overcome these particular objections, and at the same time to furnish a cheap and convenient distributing-box which can easily be applied at any point along the line, regardless of the location of the man-holes and at a trifling expense.

To this end my invention consists, generally speaking, in continuing the pipe or conduit across the distributing-point, cutting away or otherwise removing the upper portion of the same to expose the wires and cables, and fastening thereover a bottomless half box or chamber of suitable material and of sufficient size to just cover the opening in the pipe and to afford proper outlets for the branch wires.

In the accompanying drawings, forming part of this specification, Figure 1 is a plan view of the apparatus with the cover of the box removed. Fig. 2 is a side elevation of the same. Fig. 3 is a vertical cross-section through the box. Fig. 4 is an end view of the apparatus. Fig. 5 shows the part cut out or removed from the pipe. Fig. 6 is a view of the box, showing apertures in sides and bottom of same.

The main tube or conduit is indicated at A, and as seen forms a continuous path or trough across the distributing-point. At that point, however, the upper half of the tube is cut away or otherwise removed, as indicated at B, thereby exposing the wires and cables to the manipulation necessary to making the branch connections. The opening may be of any size suitable for the purpose in hand and is preferably made by removing a part of the tube in a single piece F, as shown in Fig. 5. For convenience it is preferable to remove an exact half of the tube, the remaining half serving, as will be described, to effectually guide the rod or pilot through the box; but it will be understood, of course, that more or less of the tube may be removed without departing from the spirit of my invention. The wires or cables thus exposed by the opening in the tube are protected from the action of the water, gas, and other agencies by the distributing-box proper, (indicated at C,) which is an open-bottom half box or chamber fitting down over the pipe at this point and fastened thereto in any suitable manner. The box is made of any suitable material, preferably metal, and is of ordinary construction, except in the particulars now to be noted. As the box is to fit down over the tube in the manner shown, it is essential that the box be provided with apertures in its bottom and ends to permit the tube to pass up into the box for half its diameter. These openings in the box are preferably of the following form and dimensions to make close joints between the cut edges of the opening in the tube and the cut edges of the openings in the box. The opening in the bottom of the box is of course the entire length of the box, which is approximately the length of the opening in the tube. The width of the opening is such that when the box is fitted down in place over the tube the bottom of the box makes close joints with the horizontal cut edges of the tube. Of course it will be understood that the opening might be wider or of different form, and that the joint might be formed by the aid of intervening parts or devices without departing from the spirit of my invention in this regard. The construction described being simpler, is for that reason more desirable. In the ends of the box semicircular openings n n are cut of such form and size that the ends of the box would make close joints with the tube if it passed uncut through the same. These openings through the ends of the box are as essential to preserve the passage-way of the conduit as though the pipe were in fact uncut.

In some cases, as will be further described, the cut-out portion of the tube is actually replaced in position. From the edges of the semicircular openings in the ends of the box semicircular flanges f f extend horizontally over and fit the pipe A, the ends of the box and the flanges forming close joints with the vertical cut edges of the opening in the tube A. The flanges f f afford a convenient means of attaching the box to the pipe, as by the yoke-irons c c. It will be understood that the use of the flanges and yoke-irons as a mode of fastening form no necessary part of my invention, and so with the mode of forming the close joint between the ends of the box and the vertical cut edges of the opening in the tube. The end openings may be larger and of different shape, and intervening parts and devices may be employed to effect the joint within the spirit of my invention, the only essential features of the box itself in this regard consisting of the open bottom and ends to permit the tube to pass through the lower part of the same. The box is further provided with a cover D, detachably connected in any convenient manner to give ready access to the interior of the box and to the exposed wires and cables.

o o o indicate outlets in the sides of the box, through which the branch wires may pass.

The operation of the devices will be readily understood from this description. The pipe being cut, as described, at the desired point and the open-bottomed box fastened in position over the same, making close joints with the cut edges of the opening in the pipe, the cover of the box is removed and branch connections are made as desired, the wires being passed out through the outlets o, such a wire being indicated in Fig 1. The cover being then replaced the conduit is made practically continuous at that point. The trough formed by the half-tube extending through the box serves for all practical purposes as a continuous duct or passage-way for the entrance of fresh wires or cables, preventing, as it does, the downward and sidewise deflection of the rod or pilot, which are the main sources of difficulty. In case still further precautions are needed, the tube or conduit can be made actually and absolutely continuous by replacing the piece F in position after the branch connections have been made. Under these circumstances the duct at the distributing-point differs in no respect from any other part of the line. The advantages of the distributing-box now described are sufficiently obvious. They are easily and cheaply made, are readily applied, and by the use of the continuous duct or passage-way through the box overcome the great practical difficulties encountered at present.

It will be understood generally, having in view the objects which my present invention are designed to effect, that the apparatus herein described may be varied in detail without departing from the spirit of my invention. Thus the main tube or pipe, instead of forming a constituent part of the inclosure, may pass through circular apertures in the ends of the box, the sides and bottom of the box being left intact. This construction is less economical, and for that reason less desirable, but subserves measurably the purposes of my invention. So, likewise, the length of the box might be increased and the ends rest directly upon the pipe, dispensing with the side flanges f f.

I am aware that distributing-boxes are not new, and I make no claim to such devices, broadly; but What I do claim is—

1. In an electrical-conduit system, a distributing device consisting of the main tube or pipe having a portion of the same removed, and a box or chamber for covering the opening in the pipe, and provided with a detachable cover and side outlets for branch wires.

2. In an electrical-conduit system, a distributing-box in combination with the main tube or pipe passing through the same, the pipe or tube within the box having a removable section, which can be replaced in position after branch connections are made.

3. In an electrical-conduit system, a distributing device consisting of the main pipe or tube having its upper portion removed for the desired distance, and a box or chamber for covering the opening in the tube and provided with openings in its bottom and ends to fit the edges of the opening in the tube, and with end flanges for attaching said box to said tube or pipe.

4. In an electrical-conduit system, a distributing device consisting of the main pipe or tube having its upper portion removed for a certain distance, and a distributing box or chamber for covering the opening in the pipe or tube, having the following characteristics, viz: openings in its bottom and ends to fit the edges of the opening in the pipe, means of removable attachment to the pipe, a removable cover, and exits for the branch wires.

In testimony whereof I have hereunto set my hand.

EDWARD S. PEROT.

Witnesses:
FRANK MACARTHUR,
GEORGE L. WILEY.